April 27, 1954
J. LOVE
2,676,415
WHEEL TESTING INSTRUMENT
Filed Oct. 14, 1950
3 Sheets-Sheet 1
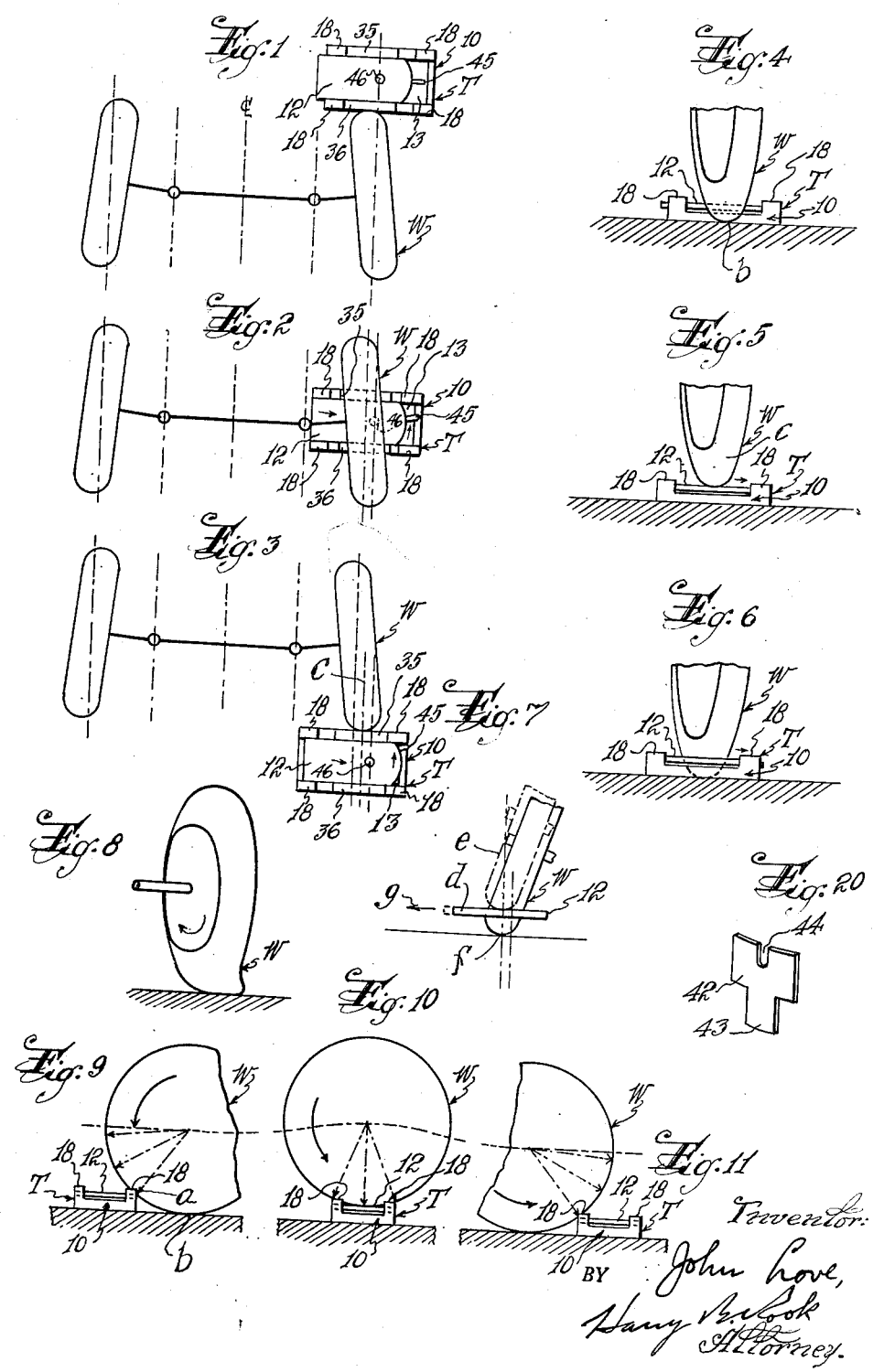

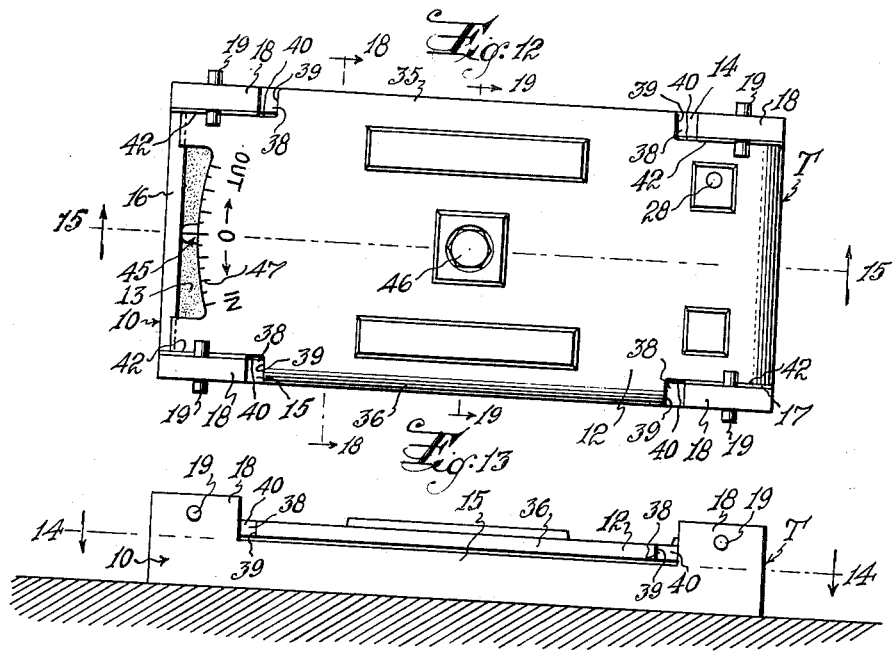
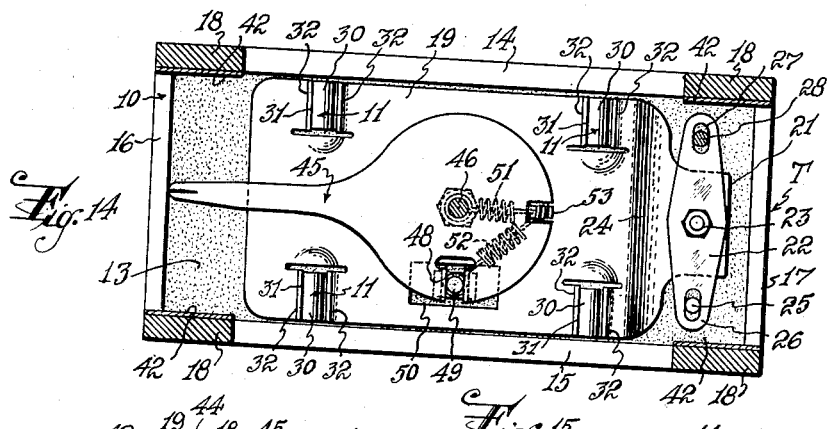
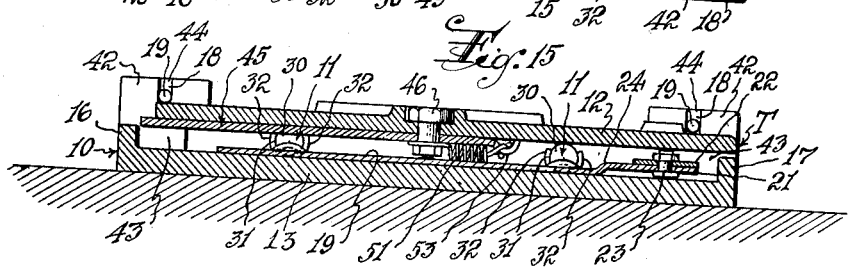

April 27, 1954
J. LOVE
2,676,415
WHEEL TESTING INSTRUMENT
Filed Oct. 14, 1950
3 Sheets-Sheet 3
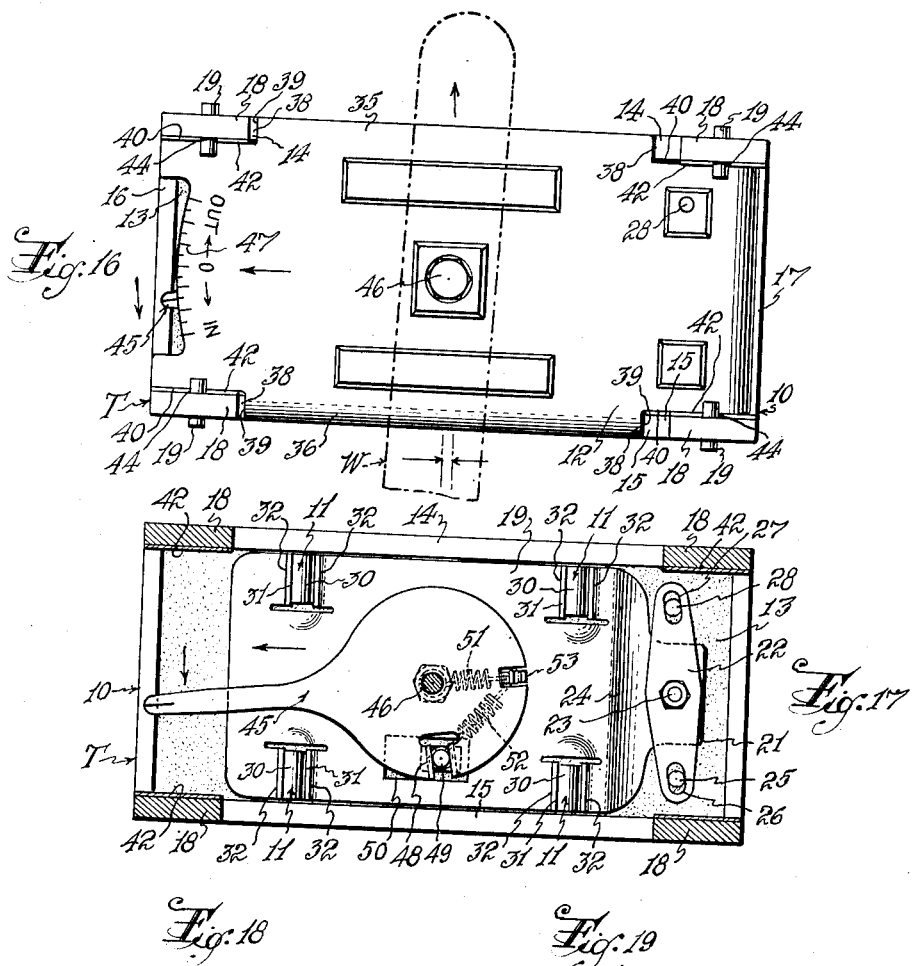
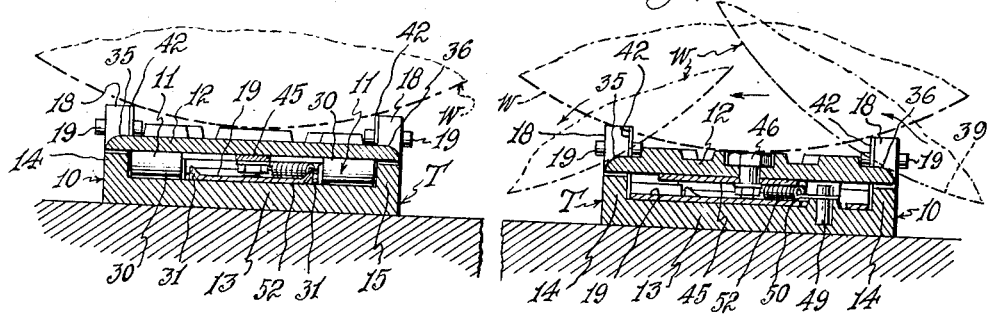
Inventor:
John Love,
BY
Harry S. Cook,
Attorney.

Patented Apr. 27, 1954

2,676,415

UNITED STATES PATENT OFFICE 2,676,415

WHEEL TESTING INSTRUMENT

John Love, West Orange, N. J.

Application October 14, 1950, Serial No. 190,205

9 Claims. (Cl. 33—203.14)

1

This invention relates generally to wheel testing instruments and is concerned in particular with an improved means and method for detecting and indicating the misalignment and the camber of wheels on a vehicle.

Testing devices that have been used heretofore for measuring the misalignment of wheels on a vehicle usually include a horizontal plate that is carried on anti-friction bearings, or the like, and is adapted for movement in a direction perpendicular to one end of the plate. These prior devices are constructed and are arranged in the path of the wheel or wheels being tested, in such manner that their respective plates move in response to a side thrust that is exerted by a misaligned wheel through the lowermost point on its rim when the wheel is driven on the top surface of the plate. The amount of shift of the plate is usually indicated on a scale by a pointer that is operatively connected to the plate.

I have found that other forces of a greater magnitude than the above mentioned side thrust of a misaligned wheel may be utilized to indicate not only misalignment without distortion by camber; but also to show, although not at the same time, the degree of camber of the wheel as well. According to my invention these other forces are availed of from the particular construction of my testing mechanism and from the manner in which I arrange it with respect to a wheel to be tested, whereby I am able to obtain more accurate test results and to use a testing mechanism that is substantially reduced in size as compared with said prior testing devices.

A general object of the invention is to provide a new and improved device for determining the disposition of a wheel on a vehicle.

Another object is to provide a device that is simple and rugged in construction and that may be manufactured at a low cost. Still another object is the provision of a wheel testing mechanism that is substantially reduced in size as compared with prior devices of this type, whereby it is readily portable and usable for the purposes intended even in confined testing places. More specifically it is an object of the invention to provide a new testing device for utilizing forces not heretofore employed when measuring the misalignment of a wheel on a vehicle.

Another object is the provision of a method and a testing mechanism for determining the degree of camber of a wheel.

A further object is to provide a method and a testing mechanism for indicating the misalignment of a wheel.

2

Other objects and various advantages of the invention will appear from the following detailed description in conjunction with the accompanying drawings which form a part of this specification.

In said drawing, Figs. 1 to 11, inclusive, are diagrammatic sketches of vehicle wheels differently positioned with respect to a testing instrument constructed in accordance with the invention; while Figs. 12 to 20, inclusive, show in detail one embodiment of the testing instrument of the invention.

More specifically, Figs. 1 to 3, inclusive, represent top plan views of a pair of misaligned automobile wheels with one of said wheels being shown approaching on top of, and rolling-away-from positions, respectively, with reference to a testing instrument of the type herein contemplated;

Figs. 4 to 6, inclusive, represent rear elevation views of a portion of said one wheel shown in Figs. 1 to 3, respectively;

Fig. 7 represents a front view of a portion of a cambered wheel as it approaches an elevated and horizontal plate;

Fig. 8 represents a perspective view of an automobile wheel on a support, illustrating in an exaggerated condition, the distortion of the tire of the wheel resulting from misalignment;

Figs. 9 to 11, inclusive, represent side elevation views of a wheel illustrating how it contacts, rides on and then rolls off from a testing device of the invention;

Fig. 12 is a top plan view of a wheel testing instrument constructed in accordance with the invention;

Fig. 13 is a front elevational view of said instrument;

Fig. 14 is a horizontal sectional view taken on the line 14—14 of Fig. 13;

Fig. 15 is a vertical sectional view taken on the line 15—15 of Fig. 12;

Fig. 16 is a view similar to Fig. 12 showing the parts of the device in their respective positions when a misaligned wheel rides on it;

Fig. 17 is a view similar to Fig. 14 showing the parts in a shifted position;

Fig. 18 is a vertical sectional end view taken substantially in the plane indicated by the line 18—18 of Fig. 12 and diagrammatically illustrating the lower portion of a wheel on top of the device;

Fig. 19 is a view similar to Fig. 18 but taken on the line 19—19 of Fig. 12; and Fig. 20 is a view in perspective of a side spring used in the illustrated device.

Broadly stated the invention consists in the provision of a horizontal platform, that is freely movable in a direction perpendicular to the front to rear and vertical plane in a vehicle, and arranging the platform in an elevated position above the surface supporting the wheel so that it will shift when the wheel contacts the edges thereof as well as when the tension in the wheel is released by rolling of the wheel on the top surface of the platform.

The wheel of a pair of wheels that are not properly aligned either toe-out so that their front portions are spread further apart than are their rear portions, or they may toe-in as illustrated in Figs. 1 to 3. When an elevated structure, such as the testing device indicated in the drawings by T, is arranged in front of a toed-in wheel W being tested, and the vehicle is moved in a straight line onto the structure with the other wheel of the pair rolling on a stationary surface, the rim of the wheel under test will contact an edge of the structure at a point, $a$, that is inwardly disposed of the lowermost or pivot point $b$. As the wheel continues to roll forward, the contact point $a$ becomes the pivot point and it will move outwardly to the line traveled by the lowermost point $b$. If the elevated structure were immovable, the point $a$ would move outwardly by sliding on the contact edge; but when the elevated structure is constituted of a freely movable platform, the point $a$ will move outwardly by shifting the platform along with it.

In like manner the toed-in wheel will move the platform outwardly when the wheel rolls over and off from the movable platform. Here (see Figs. 3 and 6) the pivot point of the wheel will be at $c$ and the platform will again move outwardly by a distance that is equal to the outward movement that occurs when the wheel rolls up and onto the platform. A toe-out condition of misalignment will cause a like succession of unidirectional movements except in this case the direction will be opposite (i. e. inwardly) to that resulting from a tie-in condition. It follows, also, that the total distance traveled by the platform is proportional to the extent of misalignment of the wheel, whereby it is possible to compute the amount of toe-in or toe-out from the measurement of this distance.

In addition to being out of alignment, a wheel may be cambered, i. e. its top leans outwardly or inwardly, of its lowermost or usual pivot point. A cambered wheel is illustrated in Fig. 7. When its forward point contacts an edge of the elevated platform $d$ on the testing device and as the wheel rolls upwardly to the position shown by the dotted line $e$ in Fig. 7, the contact point $f$ will move the platform inwardly as shown by arrow $g$. When the wheel then rolls down and off from the opposite edge of the platform, the platform will again move and to an extent equal to that of before, but this time in an opposite direction. It is for this reason that measurements for determining camber are obtained when the wheel is on top of the platform. In the case of misalignment, however, the platform moves successively in the same direction when the wheel rides on and then off from the plate. Therefore, for misalignment, readings are taken after the wheel has been driven over and off from the platform.

It is clear, of course, that these movements of the platform would not occur if the platform were on a level with the vehicle supporting surface or if ramps were provided up to the side edges of the platform. In such cases only the lowermost point on the rim of the wheel would contact the platform and the above described forces would have no effect upon the platform.

In addition to movement of the platform due to the influences described above, the platform will also shift as a result of a release of tension that is ever present in a misaligned wheel while it rolls on an immovable support. This tension is exerted by distorting the tire of the wheel W as illustrated in Fig. 8, and by straining other parts of the wheel as well as parts of the vehicle, such as the wheel axle. When a misaligned wheel is driven on to a movement support, the support will slide in a direction that releases this tension. No such tension is built up, however, from a condition of camber; therefore shifting of the platform by release of tension is due solely to a condition of misalignment and the extent of shift by release in tension is superimposed upon the movement described in connection with the discussion of Figs. 1 to 3 of the drawing.

Since platform movement due to misalignment may be measured when a wheel rolls off from the platform but movement due to camber is cancelled at that time, it would appear at first thought that the extent of misalignment and camber could be separately calculated from measurements made during a single run of the wheel over the elevated platform. This, however, cannot be done because, as explained above, release of tension occurs when the wheel is on top of the platform, thereby making it impossible to distinguish the element of camber movement from misalignment. It is necessary therefore, that a reading for misalignment be made at first and then after the misalignment has been corrected, or after the vehicle has been backed to relieve alignment tension, the wheel may then be rolled up on the platform to determine its camber.

The form of the testing instrument of the invention, as illustrated in Figs. 12 to 19, includes, essentially a base member 10 containing anti-friction means 11 that carries a movable platform 12 on top of the base member. The base 10 comprises a bottom plate 13 with upright side walls 14 and 15 and end walls 16 and 17 forming a receptacle for accommodating the anti-friction means. The side walls and the end walls of the base member rise to an equal height above the bottom plate 13 except for the extensions 18 on the end portions of the side walls. These extensions on the side walls 14 and 15 are provided in order to retain the platform in its relative position to the base member, and to mount the inwardly projecting bolts 19 that extend over the edges of the platform to keep it down on the base.

The anti-friction means 11 includes a rack 19 that is arranged within the receptacle provided by the base 10 where it slides on the bottom plate 13 in either direction toward the end walls 16 and 17. As shown in Figs. 14 and 17, the rack 19 is substantially rectangular in shape, the width thereof being slightly less than the spacing between the upright side walls 14 and 15, which act to guide the rack and prevent it from turning in the base 10. When the rack is in its normal or zero position (Fig. 14) the ends thereof are equally spaced from the nearest of the end walls. In order to keep the rack positioned at all times somewhere between the end walls of the base member, rather than allowing it to slide up against either of the end walls, the rack is provided with a retaining means that consists, in the present instance, of a projection 21 from one end of the rack and a lever bar 22 fulcrumed at 23 by means of a bolt or like pivot means. The projection 21 is raised up from the level of the rack, as shown by the bends at 24 to provide clearance for a nut, or the like on the lower end of said bolt when the rack moves on the bottom plate.

The rack is connected to the base member 10 by means of a vertical pin 25 that is fixed to the bottom plate 13 and extends through a slot 26 in one arm of lever bar 22. The other arm of the lever bar is similarly slotted as indicated by the number 27 to accommodate the vertical pin 28 that is fixed to the underside of the plateform 12 whereby the rack is also movably anchored to the platform. By this construction it is seen that the retaining means 20 not only functions to hold the rack from sliding against one of the end walls of the base member, but it also provides a connection to the platform, so that as the platform is shifted towards one of said end walls it will proportionally slide the rack 19 along with it.

The anti-friction means of the illustrated embodiment, also includes the rollers 30, that are made slightly larger in diameter than the height of the walls of the base 10, so that they can support the platform 12 at a height above said walls. These rollers are arranged in openings or cut out portions 31 in the rack 19, the spurs or projections 32 being formed at the ends of the cut out portions to provide raised contact surfaces between the rack and the sides of the rollers. Although I have herein described the anti-friction means of my invention in great detail, I desire to have it understood, of course, that any suitable anti-friction arrangement may be employed to movably carry the platform on the base member.

Referring now in more detail to the particular construction of the platform 12, it is seen from the drawing that the lateral edges 35 and 36 of the platform extend over the top surfaces of the side walls 14 and 15, so that as a wheel approaches the device, in the manner illustrated by the dotted line 39 in Fig. 19, its rim will contact an edge of the platform rather than touching any part on the base member. The edges 35 and 36 are preferably rounded off to present a larger contact surface between the platform and the wheel rim.

The corners of the platform are cut away to provide recesses 38 which accommodate the upright extension members 18 of the base member 10. These corner recesses are dimensioned so as to space the end shoulders 39 and the side shoulders 40 of the recesses away from the extension members when the platform is arranged in its normal or zero position. The end shoulders 39 act as limit stops for the platform by striking up against the extension members when the platform has moved a predetermined maximum distance in an endwise direction. The side shoulders 40 are spaced sufficiently from the extension members to receive the curved friction springs 42 which press against the side shoulders and hold the platform at the position to which it has moved during a test.

One of the springs 42 is shown in Fig. 20. When in place it is fastened at its bottom portion 43 to a side wall of an extension member 18. A notch 44 is formed in the top portion of each spring for receiving the inwardly projecting bolts 19 that hold the platform down on the base member. The springs 42 are constructed to exert sufficient force against the platform to hold the platform still after a wheel has passed over it, the frictional resistance to movement of the platform obviously being in excess of the normal frictional forces incident to movement of the platform on the supporting base member 10. However, the pressure of these springs against the platform is not so strong as to make it difficult for an operator to move the platform back to its zero position after a test has been made.

Movement of the platform from its zero position may be indicated and magnified by any suitable means. As is consistent with one of the objects of my invention to form a wheel testing mechanism of relatively small overall dimensions and of compact construction, I provide an indicating means that is located entirely within the confines of the mechanism. In the present instance, said indicating means comprises a pointer 45 that is pivotally mounted by bolt 46 to the underside of the platform 12 and is arranged to travel along a scale or series of graduations 47 located at one end of the platform. The pivot end of the pointer 45 is made wider than the free end so that it can accommodate the slot 48 which extends radially of the pivot bolt 46 and at substantially 90 degrees from the index arm of the pointer. The slot 48 engages with a vertical pin 49 that is fixed to the bottom plate 13 of the base member and passes through an opening 50 in rack 19. When the platform is shifted lengthwise on the base member, it will carry the pivot of the pointer 45 along with it, but since the pointer is also engaged with the base member through the pin 49 and slot 48 the pointer will turn on its pivot and its index arm will swing along the scale 47.

It is desirable to maintain tension between the pointer 45 and its mounting and actuating means for the purpose of eliminating any slack that might develop when these parts become worn. Such a tension is provided by the springs 51 and 52 that are stretched between a protruding lug 53 on pointer 45 and the pivot bolt 46 and the bottom plate pin 49. These springs also make it unnecessary to machine these parts to a close fit, when the testing mechanism is being manufactured.

Without further description it is thought that the manner in which the platform 12 shifts in response to contact with a misaligned or cambered wheel will be readily apparent to those skilled in the art, especially in view of the above description of the specific functions for the various elements that comprise the testing instrument and also in view of my discussion of the fundamental principles of operation that I have made in my explanation of the wheels shown in Figs. 1 to 11 of the drawing.

The foregoing disclosure is, of course, to be regarded as descriptive and illustrative only, and not as restrictive or limitative of the invention, of which obviously an embodiment may be constructed including many modifications without departing from the general scope herein indicated and denoted in the appending claims.

What I claim is:
1. A vehicle wheel testing device comprising a stationary base adapted to be placed in the path of a vehicle wheel and on a plane level with the surface of the wheel support, said base having side members and end members forming a receptacle, anti-friction means carried in said recep- tacle, a horizontal platform carried on said anti-friction means, the sides of said platform extending over said side members of said base, whereby the sides of said platform will be contacted by the rim of said vehicle wheel.

2. A testing device of claim 1 including means for holding said platform in its shifted position.

3. A vehicle wheel testing device comprising a stationary elongate base adapted to be placed in the path of a vehicle wheel, anti-friction means carried on said base, an elongate platform supported on said anti-friction means whereby said platform is shiftable longitudinally of said base, positive guide means associated with said base and engaging said platform for limiting movement of said platform to a back and forth shifting longitudinally only, the sides of said platform that are aligned to said direction being formed to extend over the edges of said base, whereby when said device is arranged in front of a vehicle wheel, the rim of said wheel will contact one of said sides rather than contacting an edge of said base.

4. The testing device of claim 2 including means adding yielding resistance to such movement of the platform for holding said platform in its shifted position.

5. A testing mechanism of the character stated comprising an elongate base having side and end walls, anti-friction means carried by said base, a horizontal platform carried by said means whereby said platform is shiftable longitudinally of said base, upstanding projections associated with said base and spaced longitudinally thereof, the platform having extensions over the side walls of said base between and to abut said projections for limiting movement of said platform in each of opposite directions, and means for indicating the amount of shifting of said platform operatively connected thereto.

6. A testing mechanism of claim 5 wherein said anti-friction means comprises a plurality of rollers that are spaced apart by a rack that is shiftable with said platform.

7. A vehicle wheel testing device as defined in claim 3 with the addition of means for indicating the amount of shifting of the platform including an indicating member, elements connecting said indicating member to both said base and said platform, and spring means for maintaining said indicating member in proper contact with both said elements.

8. A method of testing a wheel of a pair of wheels on a vehicle for misalignment, comprising the steps of moving said vehicle on a supporting surface in a straight line in one direction, causing the wheel to be tested to roll up and onto a platform that is movable on a support on said surface in a direction perpendicular to the direction of movement of the vehicle and has its top side disposed above said surface a distance less than the radius of said wheel while causing the other wheel to roll on a stationary surface, continuing said movement of the vehicle to cause the wheel under test to roll down and off said platform, thereby moving the platform horizontally in one direction, simultaneously applying frictional resistance to the movement of the platform in excess of the normal frictional forces incident to movement of said platform on said support, to hold the platform in the position assumed at the moment the wheel leaves the platform, and measuring the resultant distance traveled by the platform due to rolling of the wheel over the platform.

9. A method of testing a wheel of a pair of wheels on a vehicle for camber, comprising the steps of moving said vehicle on a supporting surface in a straight line in one direction, causing the wheel to be tested to roll up and onto a platform that is movable on a support on said surface in a direction perpendicular to the direction of movement of the vehicle and has its top side disposed above said surface a distance less than the radius of said wheel while causing the other wheel to roll on a stationary surface, thereby moving the platform horizontally in one direction, and measuring the distance traveled by the platform due to rolling of the wheel onto the platform.

References Cited in the file of this patent

UNITED STATES PATENTS

| Number | Name | Date |
|---|---|---|
| 1,487,759 | Skinner | Mar. 25, 1924 |
| 1,717,131 | Weaver | June 11, 1929 |
| 1,808,287 | Casler et al. | June 2, 1931 |
| 1,890,218 | Duby | Dec. 6, 1932 |
| 2,003,912 | Weaver et al. | June 4, 1935 |
| 2,261,342 | Darton | Nov. 4, 1941 |
| 2,439,565 | Egor | Apr. 13, 1948 |
| 2,506,167 | Pasquet | May 2, 1950 |